United States Patent
Suarez

(10) Patent No.: US 10,852,423 B2
(45) Date of Patent: Dec. 1, 2020

(54) VEHICLE-MOUNTED WAVE TRANSMISSION AND WAVE RESPONSE RECEPTION

(71) Applicant: The Government of the United States, as represented by the Secretary of the Army, Washington, DC (US)

(72) Inventor: John Suarez, Brooklyn, NY (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 358 days.

(21) Appl. No.: 15/913,953

(22) Filed: Mar. 7, 2018

(65) Prior Publication Data

US 2019/0277963 A1 Sep. 12, 2019

(51) Int. Cl.
*G01S 13/931* (2020.01)
*B60B 19/00* (2006.01)

(52) U.S. Cl.
CPC .......... *G01S 13/931* (2013.01); *B60B 19/00* (2013.01); *B60B 2900/212* (2013.01); *G01S 2013/9327* (2020.01)

(58) Field of Classification Search
CPC .................. G01S 2013/9327; G01S 13/931
See application file for complete search history.

(56) References Cited

U.S. PATENT DOCUMENTS

| | | | | | |
|---|---|---|---|---|---|
| 5,757,320 | A | * | 5/1998 | McEwan | G01S 1/045 342/387 |
| 5,777,220 | A | * | 7/1998 | Matrascia | G01M 17/022 73/146 |
| 6,736,004 | B2 | * | 5/2004 | Evans | B60C 23/066 701/514 |
| 6,896,082 | B2 | * | 5/2005 | Asanuma | G01S 13/931 180/169 |
| 8,692,706 | B2 | * | 4/2014 | Hecker | B60G 17/0165 280/5.5 |
| 9,804,258 | B2 | * | 10/2017 | Suarez | G01S 7/412 |
| 9,834,045 | B2 | * | 12/2017 | Freytag | G01M 17/02 |
| 10,286,735 | B2 | * | 5/2019 | Guinart | B60C 11/246 |
| 10,399,393 | B1 | * | 9/2019 | Trotta | B60C 23/0461 |
| 2002/0189336 | A1 | * | 12/2002 | McEwan | G01M 17/027 73/146 |
| 2003/0154007 | A1 | * | 8/2003 | Evans | B60T 8/1725 701/514 |

(Continued)

OTHER PUBLICATIONS

Balakuntala et al.; An Intelligent System to Detect, Avoid and Maintain Potholes: A Graph Theoretic Approach; arxiv.org/pdf/1305. 5522; Accessed on Dec. 15, 2014.

(Continued)

*Primary Examiner* — Peter M Bythrow
(74) *Attorney, Agent, or Firm* — Ronald Krosky

(57) ABSTRACT

Various embodiments are described that relate to wave transmission from a vehicle, and reception of a response to the transmitted wave. A vehicle wheel can include a sensor that transmits a radio wave in front of the vehicle. The radio wave can reflect off a non-uniformity, such as a speed bump or pothole, and be returned to the sensor. A controller can compare the transmitted wave against the returned wave to identify the existence of the non-uniformity.

20 Claims, 19 Drawing Sheets

(56) References Cited

U.S. PATENT DOCUMENTS

| | | | |
|---|---|---|---|
| 2004/0201462 A1* | 10/2004 | Hartlieb | G01S 13/931 340/435 |
| 2005/0120787 A1* | 6/2005 | Thiesen | B60C 11/24 73/146.5 |
| 2006/0017807 A1 | 1/2006 | Lee et al. | |
| 2009/0051581 A1* | 2/2009 | Hatono | G01S 13/10 342/33 |
| 2010/0097456 A1* | 4/2010 | Zhang | G06K 9/00798 348/119 |
| 2010/0121577 A1 | 5/2010 | Zhang et al. | |
| 2011/0291877 A1 | 12/2011 | Habboosh et al. | |
| 2013/0038484 A1* | 2/2013 | Ohkado | G01S 13/931 342/70 |
| 2013/0096731 A1 | 4/2013 | Tamari et al. | |
| 2013/0250046 A1 | 9/2013 | Schofield et al. | |
| 2014/0104424 A1 | 4/2014 | Zhang et al. | |
| 2015/0168546 A1* | 6/2015 | Nakagawa | G01S 7/282 342/21 |
| 2015/0212198 A1* | 7/2015 | Nishio | G01S 7/415 342/385 |
| 2015/0336546 A1* | 11/2015 | Al-Zahrani | B60W 30/09 701/93 |
| 2016/0252613 A1* | 9/2016 | Suarez | G01S 13/931 342/70 |
| 2017/0023943 A1* | 1/2017 | Taira | G01S 7/4026 |
| 2017/0097223 A1* | 4/2017 | Darrer | B60C 23/0486 |
| 2017/0248695 A1 | 8/2017 | Suarez | |
| 2018/0217231 A1* | 8/2018 | Stanley | G01S 7/411 |
| 2018/0374280 A1 | 12/2018 | Suarez | |

OTHER PUBLICATIONS

Rode, et al.; Pothole Detection and Warning System using Wireless Sensor Networks; http://www.ee.washington.edu/research/nsl/aar-cps/PrakharGoyal-20081021025613.pdf; Accessed on Dec. 15, 2014.

* cited by examiner

VEHICLE-MOUNTED WAVE TRANSMISSION AND WAVE RESPONSE RECEPTION

GOVERNMENT INTEREST

The innovation described herein may be manufactured, used, imported, sold, and licensed by or for the Government of the United States of America without the payment of any royalty thereon or therefor.

BACKGROUND

While driving an automobile, a driver can strive to have as smooth of a ride as possible. To achieve such a ride, the driver can select a route with roads that are better maintained than alternative routes. However, even the route with the better maintained roads can have road non-uniformities that result from use, such as potholes, or result from design, such as a speed bump. The driver can attempt to avoid or minimize impact of these non-uniformities, such as by slowing down when seeing or approaching the speed bump. If visibility is poor, then the driver may not be able to avoid or minimize impact of the non-uniformities on his or her own.

SUMMARY

In one embodiment, a system can comprise a transmission component configured to transmit a radio wave. In addition, the system can comprise a reception component configured to receive a response to the radio wave, the response being a reflection of the radio wave. Also, the system can comprise a housing configured to retain the transmission component and the reception component. Additionally, the system can comprise a mount configured to physically couple the housing to a wheel of a vehicle.

In another embodiment, a system can comprise a comparison component, a determination component, and a notification component. The comparison component can be configured to make a comparison between a transmitted radio wave against a response radio wave to produce a comparison result. The determination component can be configured to make a determination if the comparison result meets a threshold. The notification component can be configured to cause a notification to be issued when the determination is that the comparison result meets the threshold. The transmitted radio wave can be transmitted from a vehicle wheel and the reflection can be from the radio wave encountering a non-uniformity of a surface upon which the vehicle travels.

In yet another embodiment, a vehicle wheel can comprise a transmission component configured to transmit a radio wave. The vehicle wheel can also comprise a reception component configured to receive a response to the radio wave. The response can be a reflection of the radio wave and the reflection can be from the radio wave encountering a non-uniformity of a surface upon which the vehicle travels.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

FIGS. 1A-1D can be collectively referred to as FIG. 1.
FIGS. 2A and 2B can be collectively referred to as FIG. 2.
FIGS. 4A-4D can be collectively referred to as FIG. 4.

DETAILED DESCRIPTION

Figure 1A:
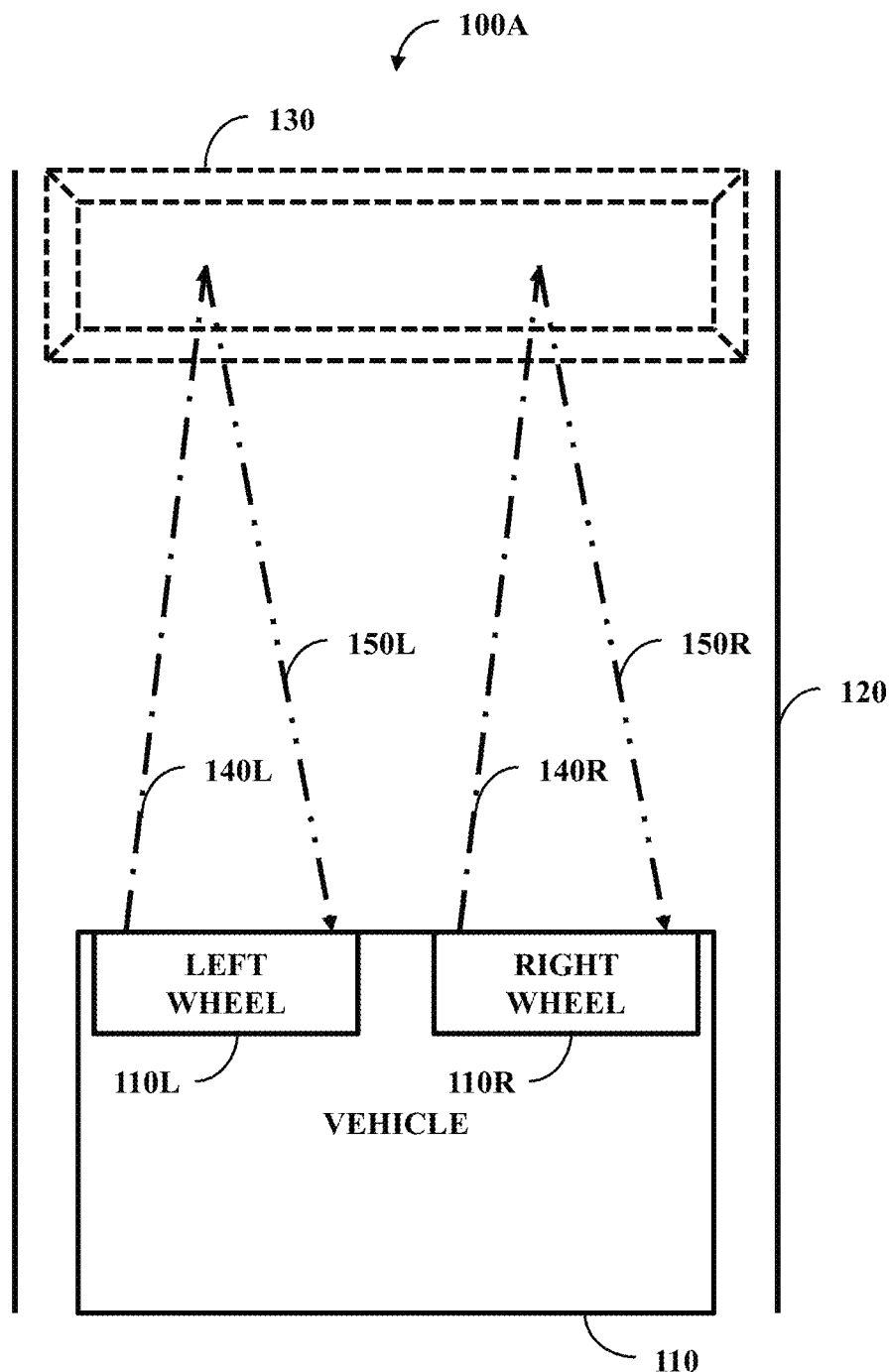
FIG. 1A illustrates one embodiment of a top-down view of a vehicle traveling on a surface with a non-uniformity.

A vehicle, such as a car, can drive on various surfaces. For example, the car can drive on a road. The road can be designed to be uniform, such as by being flat or flat relative to terrain. However, the road may experience non-uniformity in parts. An intended non-uniformity can be a speed-bump designed to have cars lower their speed while an un-intended non-uniformity can be pothole-produced over-time from environmental and other factors.

If the vehicle drives over the non-uniformity, then a driver and/or passenger of the vehicle can experience an unpleasant stimulus. To mitigate this unpleasantness, a sensor can be used to identify the non-uniformity. The sensor can be placed on a wheel of the vehicle. The sensor can emit a radio wave. The radio wave can reflect off the non-uniformity and the sensor can collect this reflection. The radio wave transmission and reflection can be compared to identify existence of the uniformity. With the existence of the uniformity identified, a notification can be emitted to the driver. In one example, the notice can indicate to the driver to slow down, so the speedbump is less impactful.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element; but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software-controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1A illustrates one embodiment of a top-down view 100A of a vehicle 110 (e.g., automobile, motorcycle, boat, bicycle, etc.) traveling on a surface 120 (e.g., paved road, dirt road, open terrain, water, etc.) with a non-uniformity 130 (e.g., speed bump, pothole, ice and/or black ice, wave, etc.). The non-uniformity 130 can also be a change in surface type, such as from a concrete road to an asphalt road. If the vehicle 110 travels over the non-uniformity 130 at all, travels over the non-uniformity 130 at an undesirable speed (e.g., too fast), travels over the non-uniformity 130 at an undesirable angle, etc., then a negative outcome can occur. Examples of the negative outcome can include one or more disruptions for the driver, injury to the driver, damage to the vehicle 110, harm to the surface 120, or destruction of the non-uniformity 130.

In one example, the vehicle 110 can be an automobile with a left wheel 110L and a right wheel 110R. The wheels 110L and 110R can be configured to emit a transmission radio wave 140L and 140R, respectively. The transmission radio waves 140 can be transmitted directly ahead of the vehicle 110 toward a direction of travel for the vehicle 110. The transmission radio waves 140 can encounter the non-uniformity 130. The transmission wave 140L can reflect as response wave 150L and transmission wave 140R can reflect as response wave 150R. In one embodiment, the transmission waves 140 can be continuously transmitted and in turn the reflected waves 150 can be continuously received.

Figure 1B:
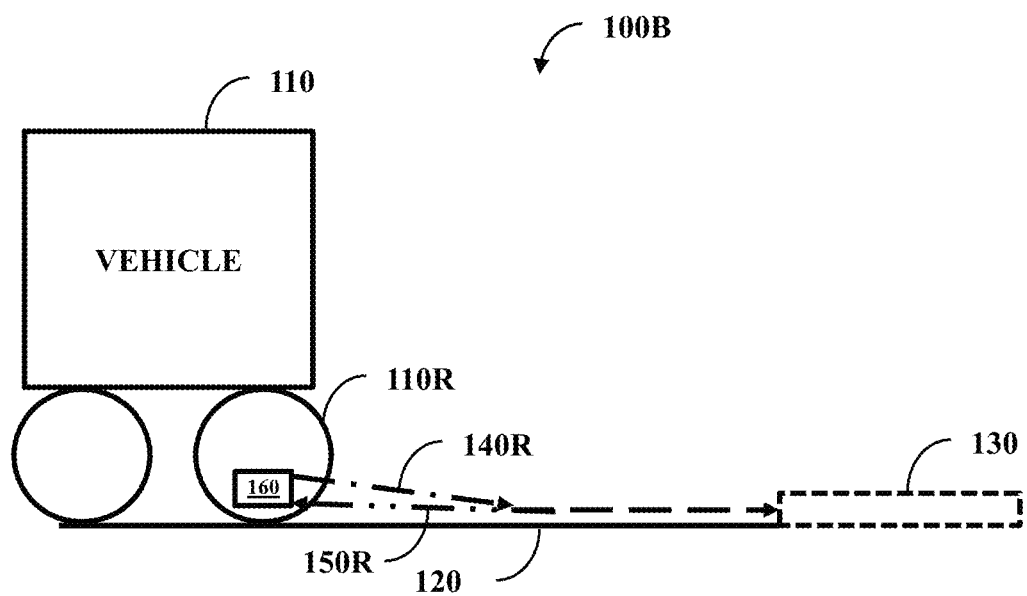
FIG. 1B illustrates one embodiment of a profile view of the vehicle with a transceiver module traveling on the surface with the non-uniformity.

FIG. 1B illustrates one embodiment of a profile view 100B of the vehicle 110 with a transceiver module 160 traveling on the surface 120 with the non-uniformity 130. Due to the profile nature, the right side is discussed (e.g., waves 140R and 150R). The transceiver module 160 can function as a sensor that emits the transmission wave 140R and receives the response wave 150R.

Figure 1C:
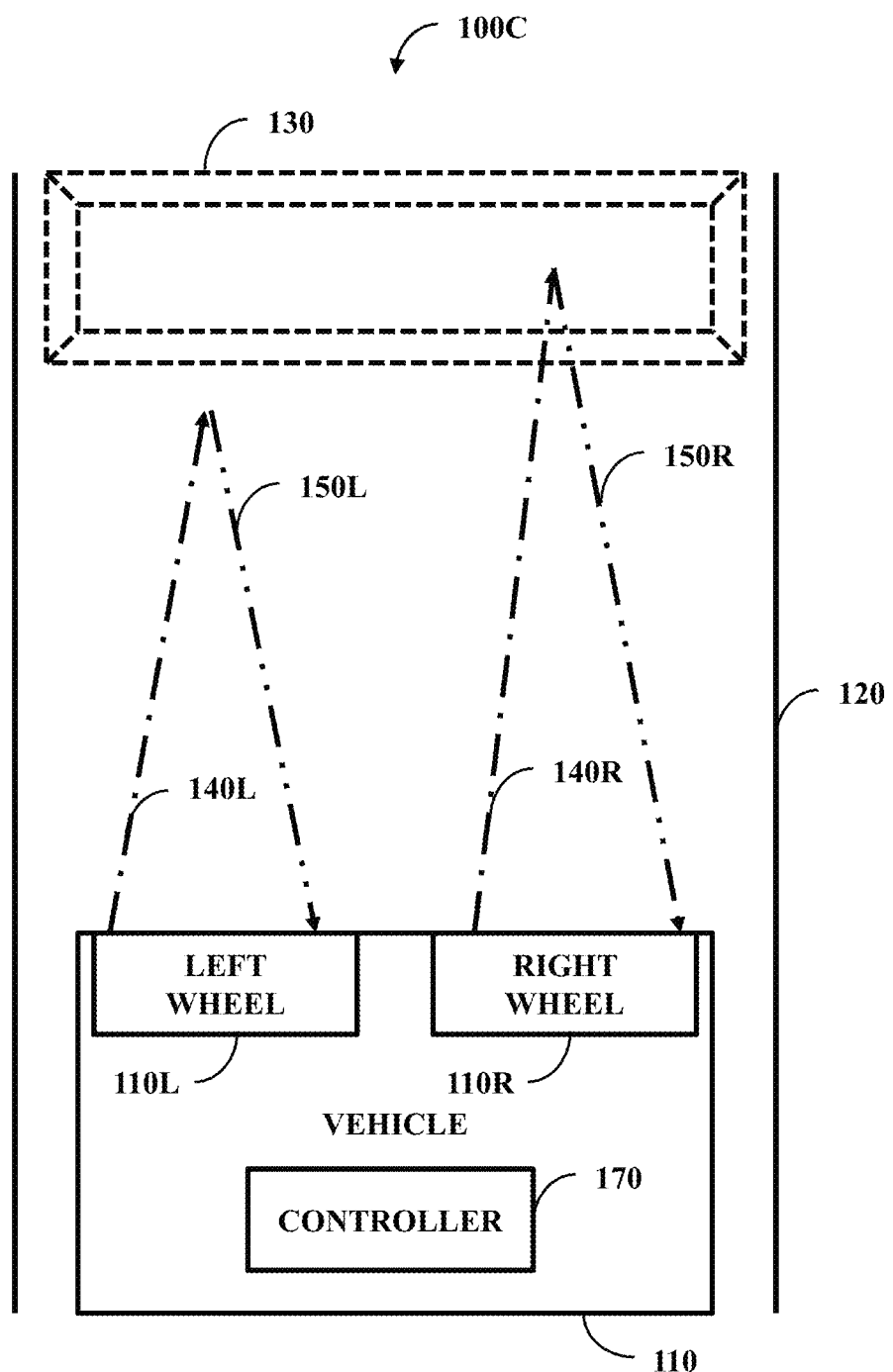
FIG. 1C illustrates one embodiment of a top-down view of the vehicle with a controller traveling on the surface with the non-uniformity.

FIG. 1C illustrates one embodiment of a top-down view 100C of the vehicle 110 with a controller 170 traveling on the surface 120 with the non-uniformity 130. The transmission waves 140 can be continuous (e.g., continue along the surface 130 until interrupted) or focused (e.g., angled to impact the surface at a specific location).

With the focused waves, the transmission waves 140L and 140R can be transmitted to different locations of the surface 120 and at least some of these waves can be reflected back, such as the reflected waves 150L and 150R. These transmission waves 140L and 140R can be of the same frequency or be of different frequencies. The transmission waves 140L and 140R can be aimed to different parts of the surface (e.g., differing along the x-axis and/or differing along the y-axis) and reflections of these waves can be received by the vehicle 110.

The controller 170 can manage how the vehicle transmits and receives the waves 140L/R and 150L/R. In one example, the controller 170 can instruct sensors in the left front wheel 110L and the right front wheel 110R to emit the waves 140 (e.g., emit them at times so they are staggered). When the wheels 110L/R receive their respective response wave 140L/R, the wheels 110L/R can forward them to the controller 170 (e.g., wirelessly) and the controller 170 can process the waves 140L/R (e.g., compare against the transmitted waves 140L/R).

In one embodiment, the wheels 110L and 110R can work together. In one example, the left wheel 110L can transmit the transmission radio wave 140L. The reflection radio wave 150L can be received by the right wheel 110R (e.g., due to movement of the vehicle or angle of reflection of the non-uniformity 130). The converse can be true for the right wheel 110R. The controller 170 can be configured to process the waves 140L/R and 150L/R and compensate for discrepancy caused by being transmitted from one wheel and received by a different wheel. Additionally, the waves 140R/L and 150R/L can be transmitted and received from different parts of the vehicle 110 (e.g., one from a front bumper and another from vehicle frame portion) and the controller 170 can compensate for discrepancies.

Figure 1D:
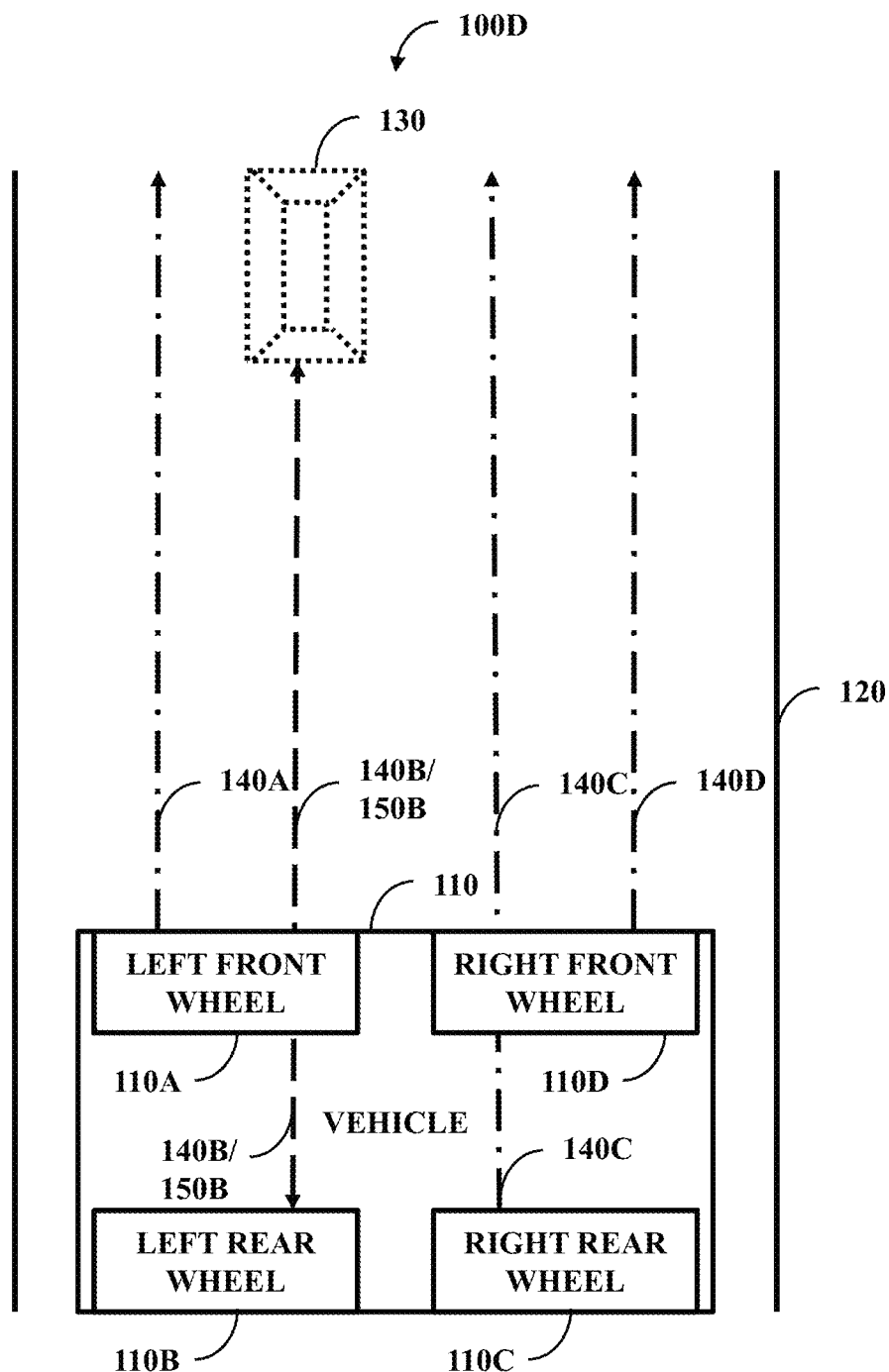
FIG. 1D illustrates one embodiment of a top-down view of the vehicle traveling on the surface with the non-uniformity.

FIG. 1D illustrates one embodiment of a top-down view 100D of the vehicle 110 traveling on the surface 120 with the non-uniformity 130. Here, four wheels are illustrated—left front wheel 110A, left rear wheel 110B, right rear wheel 110C, and right front wheel 110D. The wheels 110A-D can emit their own transmission waves 140A-D. Some waves (140A, 140C, and 140D) can continue without encountering a non-uniformity or reach the non-uniformity at such a distance that the reflection is weak or is merely absorbed by the non-uniformity. However, another wave, transmission wave 140B, can reflect back of the non-uniformity 130.

As can be seen, some non-uniformities may not extend the entire surface and therefore waves can be placed at different part of the surface 120. Sensors for the wheels 140A-D can be staggered to cover more of the surface (e.g., the left front wheel 110A has a sensor flush left, while the left rear wheel 110B has a sensor flush right so waves do not overlap and there is more surface). Furthermore, the rear-wheel sensors can be more powerful than the front wheel sensors since the waves 140B/C and 150B/C may have to pass through front wheels.

Figure 2A:
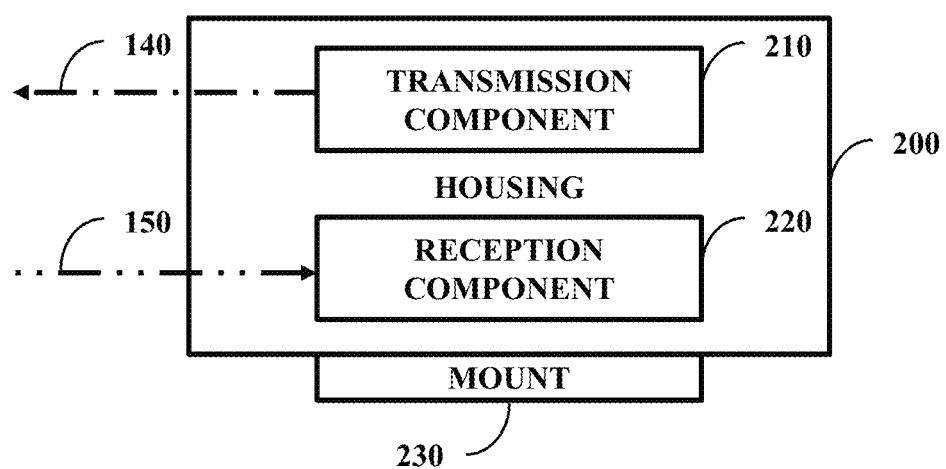
FIG. 2A illustrates one embodiment of a housing retaining a transmission component and a reception component along with a mount.

FIG. 2A illustrates one embodiment of a housing 200 retaining a transmission component 210 and a reception component 220 along with a mount 230. The transmission component 210 can be configured to transmit a radio wave (e.g., the transmission radio wave 140). The reception component can be configured to receive a response to the radio wave (e.g., the response radio wave 150 that is a reflection from the transmission radio wave encountering the non-uniformity 130 of FIG. 1). The mount 230 can be configured to physically couple the housing 200 to a wheel of the vehicle 110 of FIG. 1 or elsewhere on the vehicle (e.g., on a front bumper of the vehicle 110 of FIG. 1).

Figure 2B:
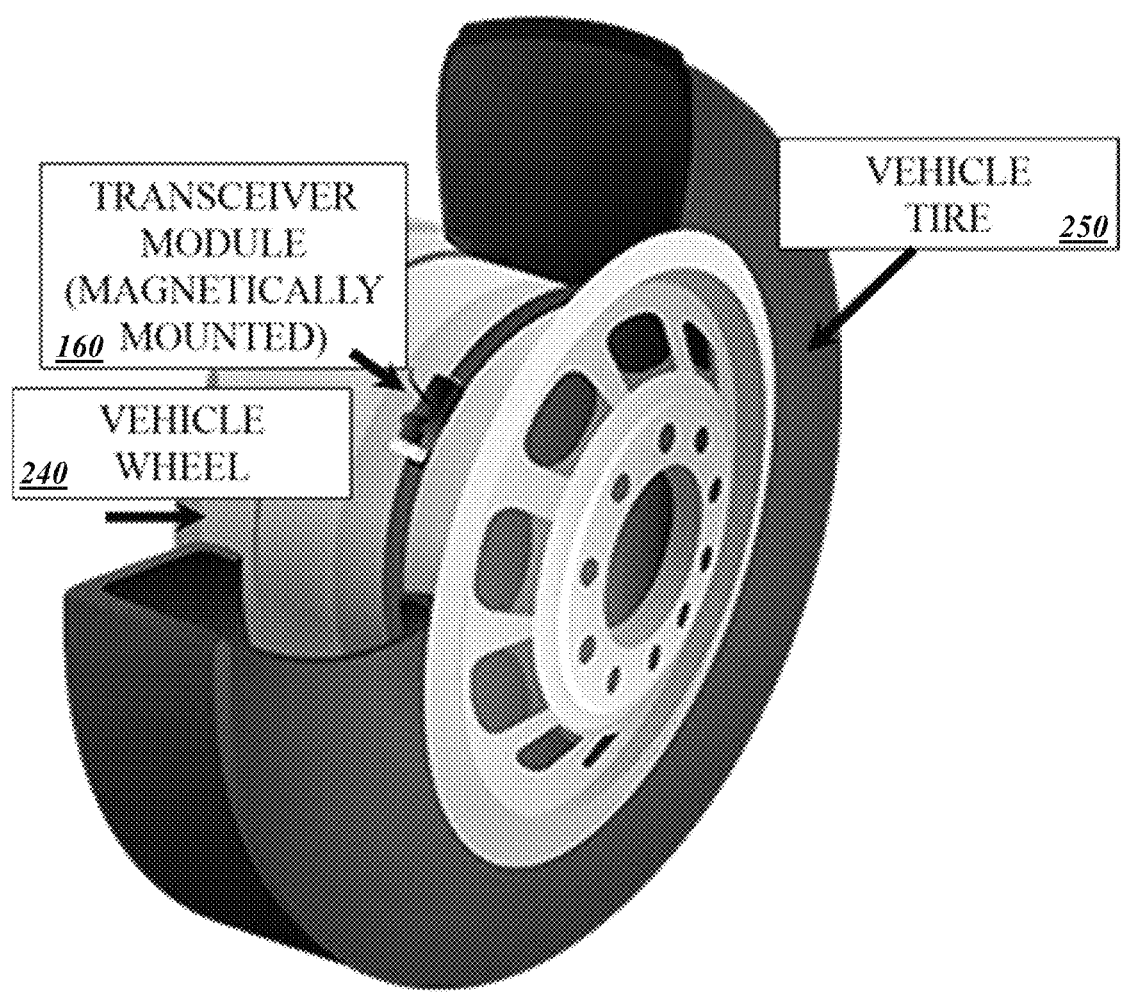
FIG. 2B illustrates one embodiment of a vehicle tire along with a vehicle wheel and the transceiver module.

FIG. 2B illustrates one embodiment of a vehicle wheel 240 with a vehicle tire 250 and the transceiver module 160. The housing 200 can function as the transceiver module 160 and the mount 230 can couple the transceiver module 160 to the vehicle wheel 240. The vehicle wheel 240 can support the vehicle tire 250 and the housing can be coupled to the tire side of the vehicle wheel 240 (e.g., the housing 200 and/or the vehicle tire 250 can be part of the vehicle wheel 240).

In one embodiment, the vehicle wheel 240 comprises an outer rim and a rim support that is about 90 degrees from the rim. The mount can be configured to physically couple the housing 200 to the rim support of the vehicle wheel 240. This physical coupling can be by way of magnet, with the magnetic force strong enough to hold the transceiver module 160 in place as the vehicle wheel 240 rotates as the vehicle travels.

In one embodiment, the mount is configured to physically couple the housing to a brake portion of the wheel. In one example, the vehicle wheel 240 can comprise a disc brake rotor and a brake pad. The brake pad can engage with the brake rotor to stop the vehicle. The brake pad can be stationary while the disc brake rotor and rim support, with, rim rotates. Due to not rotating, the brake pad can experience less motion than if mounted on the rim support.

In one embodiment, the transceiver module 160 is powered by heat energy produced from braking. In one embodiment, the transceiver module 160 is powered by a wired connection to the vehicle 110 of FIG. 1 that does not become tangled since the brake pad does not rotate (e.g., module power cord is integrated with brake line). In one embodiment, the transceiver module 160 is powered by a battery (e.g., replaceable battery changeable during tire rotation). In one embodiment, the transceiver module is powered wirelessly.

Figure 3:
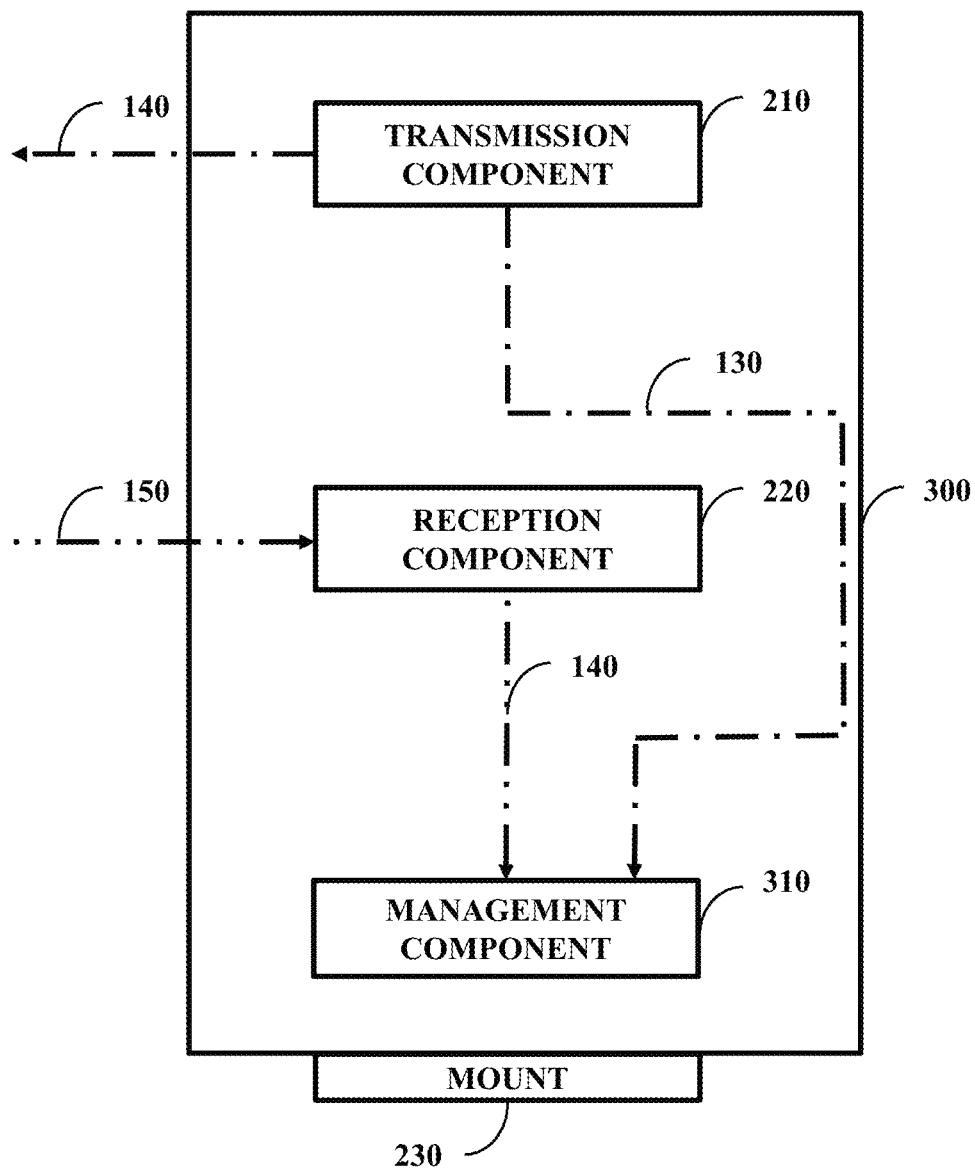
FIG. 3 illustrates one embodiment of a housing retaining the transmission component, the reception component, and a management component along with a mount.

FIG. 3 illustrates one embodiment of a housing 300 retaining the transmission component 210, the reception component 220, and a management component 310 along with a mount 230. Operation of the transceiver module 160 of FIG. 2B can be managed locally (e.g., in the transceiver module 160 of FIG. 2B) or remotely (e.g., from a computer that is part of the vehicle or a mobile device of a driver of the vehicle). This management can be performed by the management component 310 (e.g., implemented as the controller 170 of FIG. 1).

Figure 4A:
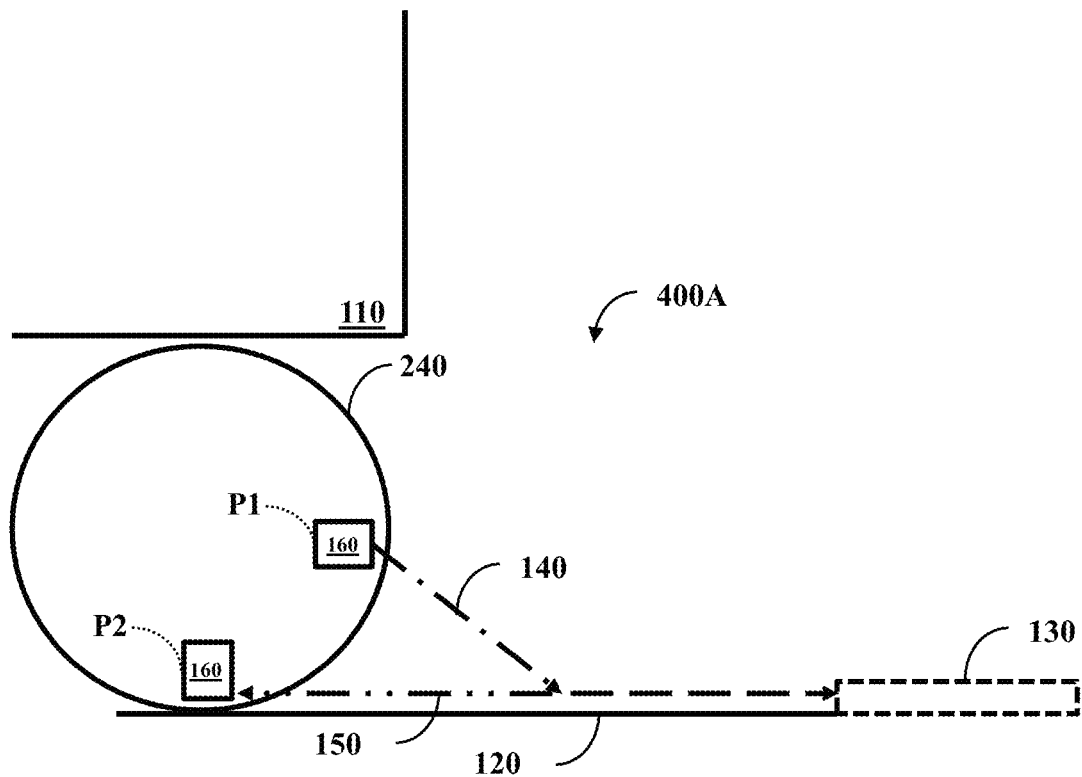
FIG. 4A illustrates one embodiment of an environment with the vehicle wheel, with the transceiver module in a first position and a second position.

FIG. 4A illustrates one embodiment of an environment 400A with the vehicle wheel 240, with the transceiver module 160 in a first position P1 and a second position P2. In one embodiment the module 160 can be a band that wraps around the rim support; however, the module 160 can be a small sensor placed on the rim support that does not surround the rim support. The module 160 can transmit the transmission wave 140 from position P1. The transmission wave 140 can travel along the surface 120 and impact the non-uniformity 130. The reflection wave 150 can travel along the surface 120 and be received by the module 160 while in position 2. Therefore, the module 160 can transmit and receive in different positions.

In one embodiment, the duration of the transmission can be equal to or greater than a rotation of the wheel. This way, transmission and reception can occur at the same position. This is because the reflected wave 150 can return for a duration for it to reach the sensor in the same position again.

Figure 4B:
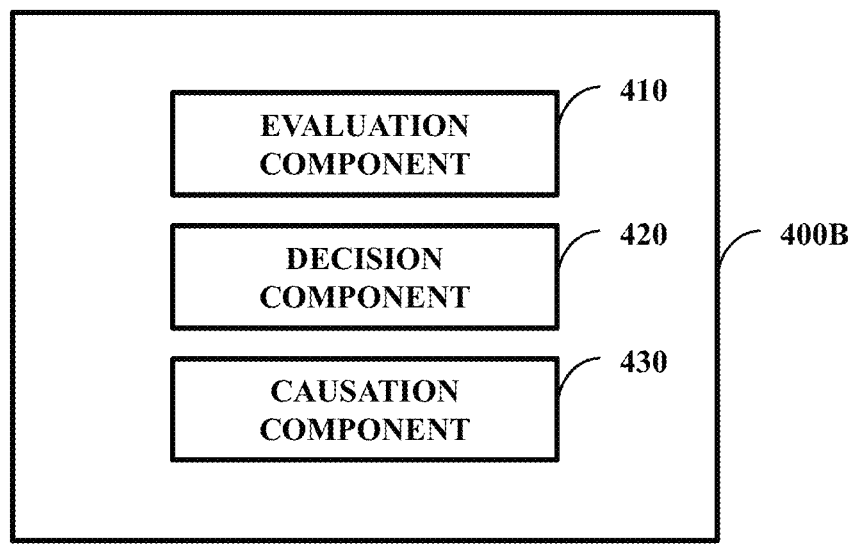
FIG. 4B illustrates one embodiment of a system comprising a comparison component, a determination component, and a notification component.

FIG. 4B illustrates one embodiment of a system 400B comprising a comparison component 410, a determination component 420, and a notification component 430. In one embodiment, the system 400B is an implementation of the management component 310 of FIG. 3. A single wheel can be designed to be used on different cars. In one example, a tire can be serviceable on a lower-riding coupe and a higher-riding sedan. In the higher-riding sedan, the waves 140 and 150 can pass through the tire and interact with the surface. However, on the lower riding coupe, part of the coupe can cover the front of the tire, and therefore the waves 140 and 150 pass through not only the tire, but part of the vehicle itself.

To be able to pass through the vehicle 110 and tire 250 of FIG. 2, which may have material such as metal that can interfere with the waves 140 and 150, the waves 140 and 150 should be at a sufficient power so as not to be interfered with (e.g., due to attenuation) by the vehicle 110. While a default level can be of a strong power level so no matter the vehicle 110 the waves will permeate without significant interference, this can cause a battery to lose energy more quickly and be generally wasteful. Therefore, the system 400B can be used to manage wave strength.

The evaluation component 410 can be configured to evaluate if the transmitted radio wave 140, the reflected radio wave, or a combination thereof are modified (e.g., are being modified or are anticipated to be modified) beyond an acceptable level, in relation to a threshold (e.g., a user defined threshold), from passing through a material of the vehicle 110. The decision component 420 can be configured to decide a level to increase a power level at which the transmission radio wave 140 is transmitted when the modification is beyond the acceptable level. The causation component 430 can be configured to cause the power level to be at the decided level (e.g., the decided level is a level to cause the transmission to be at least at the acceptable level of power).

In one embodiment, the module 160 is a generic module that can be placed in different tires. Tires can have metal that can influence the waves 140 and 150. This metal can be of different materials, be of different thicknesses, etc. When installed on a vehicle 110, the system 400B can calibrate the module 160 so the module 160 functions with the end vehicle 110.

In one embodiment, power level can be based, at least in part, on anticipated non-uniformities. For a common commercial vehicle, non-uniformities can be expected to be concrete or asphalt, but some vehicles, such as off-roading vehicles, can expect other non-uniformities, such as rocks. Since the transmission wave 150 reflects differently depending on the material of the non-uniformity 130, the system 400B can select the power level based on the anticipated non-uniformity material/configuration.

In one embodiment, a determination on when to emit the notification can be based on a distance of the non-uniformity 130 from the vehicle 110. Radio waves can travel far distances and then be returned. If an automobile is on a road and a speed bump is several miles away, a premature notification can be annoying, not useful, and irrelevant (e.g., a driver of the automobile can be scheduled to turn off the road before the speed bump is ever reached). Therefore various factors can be considered when analyzing the notification. In one example, a global positioning system application can be referenced to determine if the automobile is anticipated to still be on the road when the speed bump is reached.

Figure 4C:
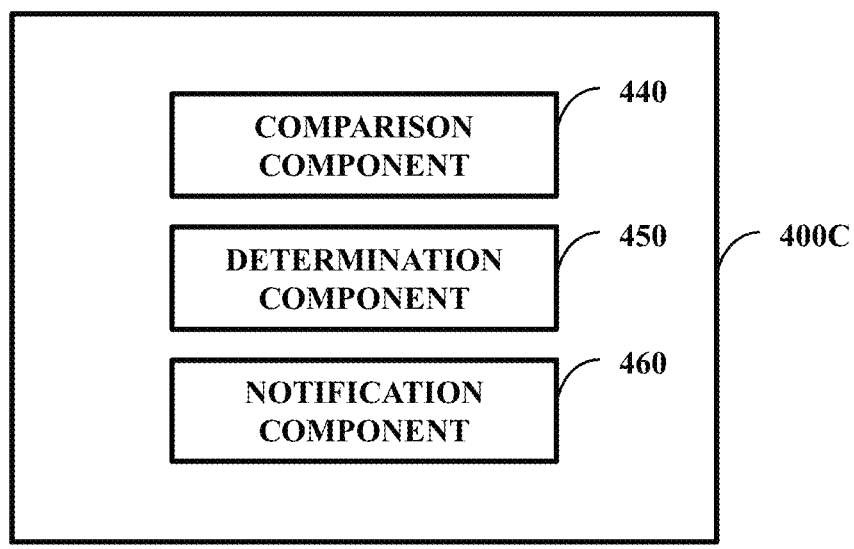
FIG. 4C illustrates one embodiment of a system comprising a comparison component, a determination component, and a notification component.

FIG. 4C illustrates one embodiment of a system 400C comprising a comparison component 440, a determination component 450, and a notification component 460. The system 400C can be used to detect the non-uniformity. If the transmission wave 140 does not reflect back, then an inference can be drawn that there is not a non-uniformity 130 nearby. By contrast, if the transmission wave 140 does reflect back, then the non-uniformity exists. However, not every non-uniformity may be significant enough to warrant notification (e.g., to a driver of the vehicle 110). Therefore, the system 400C (e.g., functioning as the management component 310 of FIG. 3) can determine if the non-uniformity is significant enough to warrant notification.

The comparison component 440 can be configured to make a comparison of the transmitted radio wave 140 against the response radio wave 150 to produce a comparison result. The determination component 450 can be configured to make a determination if the comparison result meets a comparison threshold. The notification component 460 can be configured to cause a notification to be issued when the determination is that the comparison result meets the comparison threshold, and no notification when the comparison result does not meet the threshold.

The notification can manifest in different ways. In one embodiment, the notification is a sensory alert (e.g., beeping noise or flashing light) to a driver of the vehicle 110. The closer the vehicle 110 is to the non-uniformity 130 and/or the more severe the non-uniformity 130 (e.g., higher the bump or deeper the hole), then the louder or faster the notification can play.

In one embodiment, the vehicle 110 is a self-driving vehicle. The notification can be a message to a control apparatus of the self-driving vehicle. The self-driving vehicle (e.g., autonomous driving vehicle or semi-autonomous driving vehicle) can make a driving adjustment in response to the message.

As illustrated in FIG. 4A, the wheel 240 can rotate such that the transmission component 210 of FIG. 1 is configured to transmit the radio wave 140 when the module 160 is in the first position P1. Similarly, the reception component 220 of FIG. 2 can be configured to receive the response to the radio wave 150 when the module 160 is in the second position P2 (different from the first position). The comparison component 440 can be configured to make the comparison while compensating for the difference between P1 and P2.

Figure 4D:
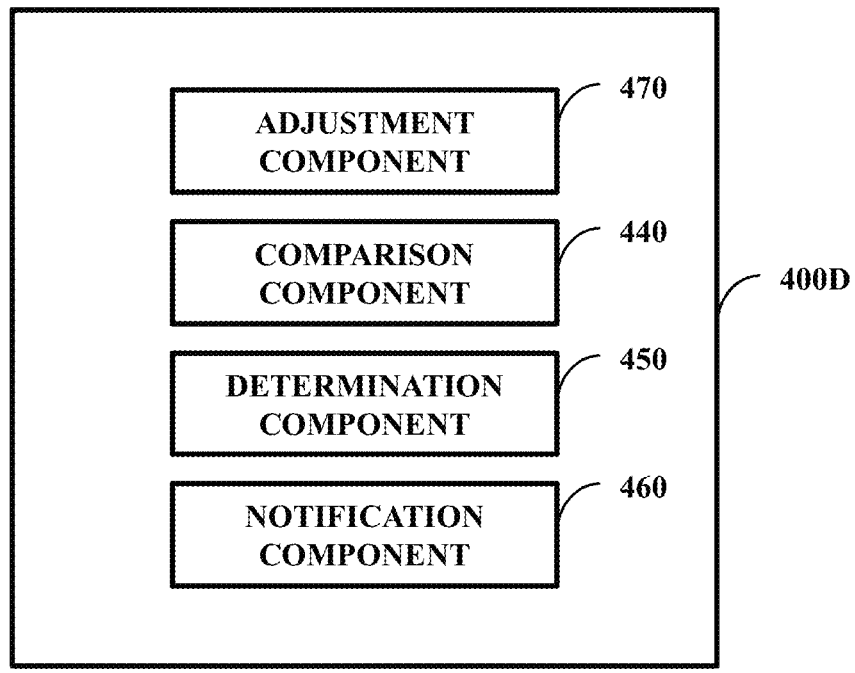
FIG. 4D illustrates one embodiment of a system comprising an adjustment component, the comparison component, the determination component, and the notification component.

FIG. 4D illustrates one embodiment of a system 400D comprising an adjustment component 470, the comparison component 440, the determination component 450, and the notification component 460. The adjustment component 470 can be configured to make an adjustment to the transmission radio wave to produce an adjusted transmission radio wave. The comparison component 440 can be configured to make a comparison between the transmitted radio wave against the adjusted response radio wave to produce the comparison result. Therefore, the system 400D (e.g., when functioning as the management component 310 of FIG. 3) can manage practical situations that occur.

This adjustment can include applying an algorithm to the transmission wave. With one example algorithm, the transmission wave sent at P1 can be compared with a transmission wave sent from P2 at another time, a difference can be determined, and the difference subtracted from the transmission wave sent at P1. This algorithm can work if the same transmission wave 140 is sent out at different times (e.g., continuously or periodically).

In one example, a three-hundred and sixty degree sample, one for each degree of rotation, can be identified and saved for the transmission wave 140. When the response wave 150 is received, a position of the module 170 can be determined. The nearest-positional saved transmission wave can be used for comparison and this can be considered an adjustment of the wave that was sent out.

In one embodiment, the adjustment component 470 can be configured to make an adjustment to the transmitted radio wave 140 and the reception radio wave. The comparison component 440 can be configured to make a comparison between the adjusted transmitted radio wave against the adjusted response radio wave, to produce the comparison result. This adjustment can be due to the waves 140 and 150 travelling through a vehicle section and/or the tire 250 of FIG. 1.

In one embodiment, the transceiver module 160 can be a series of modules on a band or a singular, circular band (e.g., three-hundred and sixty about equally sized modules on a band). The band can alternatively emit the waves 140 from the module closest to the surface 120 as a continual check. This can allow the radio waves 140 and 150 to travel close to the surface.

While radio waves (e.g., about three-hundred gigahertz to about three kilohertz) are discussed, other waves can be used. If the wavelength is too long, then the wave will pass over some depression non-uniformities and therefore they will be missed. If the wavelength is too short, then too many non-uniformities or phantom non-uniformities can be detected.

Figure 5:
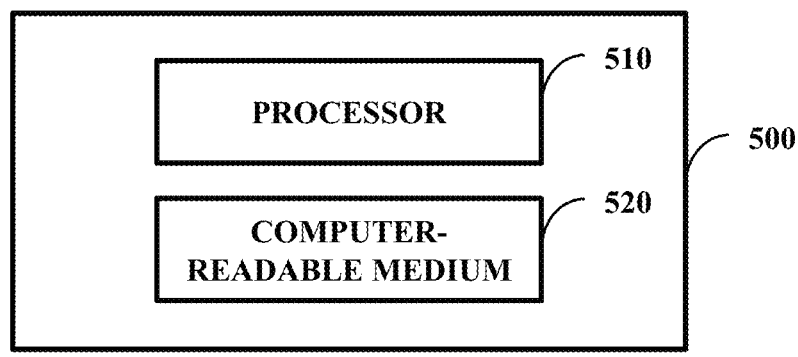
FIG. 5 illustrates one embodiment of a system comprising a processor and a computer-readable medium.

FIG. 5 illustrates one embodiment of a system 500 comprising a processor 510 (e.g., a general purpose processor or a processor specifically designed for performing a functionality disclosed herein) and a computer-readable medium 520 (e.g., non-transitory computer-readable medium). In one embodiment, the computer-readable medium 520 is communicatively coupled to the processor 510, and stores a command set executable by the processor 510 to facilitate operation of at least one component disclosed herein (e.g., the management component 310 of disclosed in FIG. 3). In one embodiment, at least one component disclosed herein can be implemented, at least in part, by way of non-software, such as implemented as hardware by way of the system 500 (e.g., the transmission component 210 of FIG. 2 and/or the reception component 220 of FIG. 2). In one embodiment, the computer-readable medium 520 is configured to store processor-executable instructions that, when executed by the processor 510, cause the processor 510 to perform a method, that can be an example algorithm, disclosed herein (e.g., the methods 600-1100 addressed below).

Figure 6:
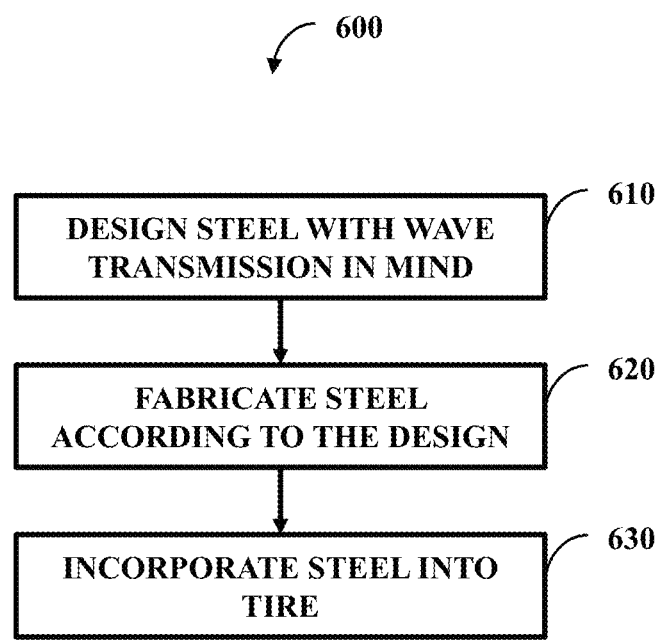
FIG. 6 illustrates one embodiment of a method comprising three actions.

FIG. 6 illustrates one embodiment of a method 600 comprising three actions 610-630. The method 600 can be used in tire design and tire manufacturing. As discussed above, the vehicle tire 250 of FIG. 2 can have steel, such as a steel belt, as part of the tire 250 of FIG. 2. If the module 160 of FIG. 2 is placed behind the tire 250 of FIG. 2 relative to the surface 120 of FIG. 2, then waves 140 and 150 of FIG. 1 can be impacted by the steel belt. The method 600 can be employed to design a steel-belted tire that is not impactful or less impactful to the waves 140 and 150 of FIG. 1. Aspects of the method 600, such as actions 610-630, can be used for steel belt design as well as other design aspects of the tire 250 of FIG. 2 (e.g., nylon cap design, carcass material selection, etc.).

At 610, the steel belt can be designed with transmission in mind. In one example, the belt can be designed with small holes that would align with the module 160 of FIG. 2 without significantly compromising structural integrity of the steel belt (e.g., significance can be defined by a manufacture determine percentage). In another example, a specific metal can be selected (e.g., selection based, at least in part, on metal alloy composition or crystal structure regarding strength of material) to lower (e.g., minimize) attenuation of the waves 140 and 150 of FIG. 1. In yet another example, action 610 includes selection of a construction technique (e.g., layering/arrangement of plastic and metal sheets and/or braiding of plastic and metal fibers). Action 610 can be performed by an industrial design software suite (e.g., implemented as software stored on the computer-readable medium 520 of FIG. 5 and executable by the processor 510 of FIG. 5).

At 620, the steel belt can be fabricated, such as by a computer numerical control machine. Other items can be fabricated as well, such as outer rubber of the steel-belted tire. At 630, the steel belt can be incorporated into the tire (e.g., the tire can be constructed), such as by an industrial control process. Additionally, the module 160 of FIG. 2 can be manufactured at 630 and/or incorporated into a wheel. In one example, the module 160 of FIG. 2 is placed on the rim support and the vehicle tire 250 of FIG. 2 is placed on the rim support with the holes in the steel belt aligning with the module 160 of FIG. 2.

Figure 7:
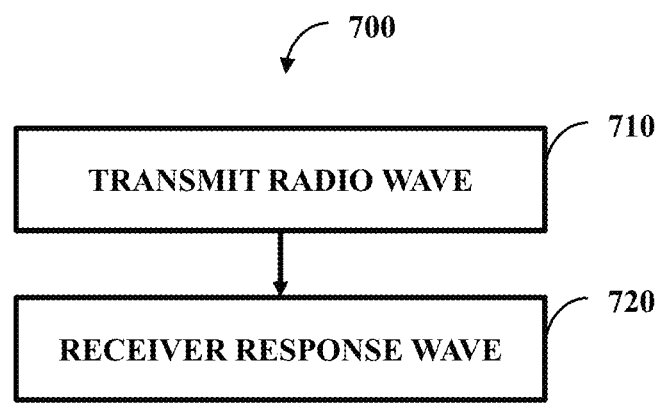
FIG. 7 illustrates one embodiment of a method comprising two actions.

FIG. 7 illustrates one embodiment of a method 700 comprising two actions 710-720. At 710, the transmission wave 140 of FIG. 1 can be transmitted, such as by a first module (e.g., a first edition of the module 160 of FIG. 1). At 720, the response wave 150 of FIG. 1 can be received, such as by a second module (e.g., a second edition of the module 160 of FIG. 1). In one embodiment, the first module and second module are on different tires (e.g., one front and one back or one right and one left).

Figure 8:
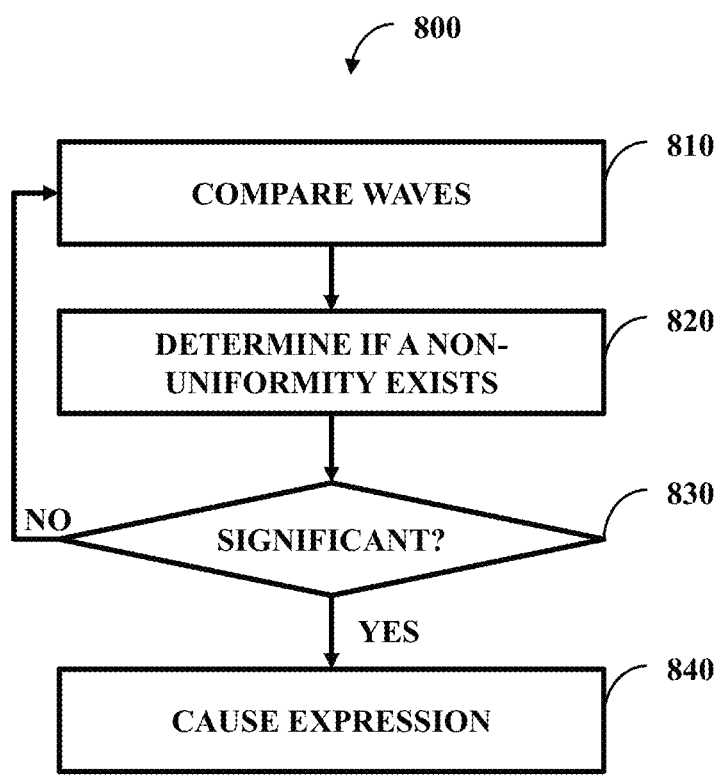
FIG. 8 illustrates one embodiment of a method comprising four actions.

FIG. 8 illustrates one embodiment of a method 800 comprising four actions 810-840. At 810, waves can be compared against one another and at 820 a determination is made if the non-uniformity 130 of FIG. 1 exists. While comparison between the transmission wave 140 of FIG. 1 and the response wave 150 of FIG. 1 can be practiced, other implementations are possible.

In one embodiment, comparison results can be compared with one another to determine existence of the non-uniformity 130 of FIG. 1. In one example, transmission waves 140 of FIG. 1 can be continuously sent out (e.g., with different waves defined by set time intervals) and response waves 150 of FIG. 1 can be continuously received. Transmission waves 140 of FIG. 1 and response waves 150 of FIG. 1 can be compared against one another to produce comparison results (e.g., it does not matter what transmission wave 150 of FIG. 1 is compared against what response wave 140 of FIG. 1 if the transmission waves 150 of FIG. 1 are the same). The results can be compared against one another. While a difference may exist, if the difference does not change, then an inference can be drawn that the non-uniformity 130 of FIG. 1 does not exist as defined. As an example of this, if the difference does not change (e.g., no significant time lapse between transmission and reception and no significant change in return wave composition), then an inference can be drawn (e.g., by an artificial intelligence component) that what the module 160 of FIG. 2 is detecting is another vehicle in front of the vehicle 110 of FIG. 2 and not a non-uniformity 130 of FIG. 2 of the surface 120 of FIG. 2. This does not mean something not part of the surface 120 of FIG. 2 cannot be considered a non-uniformity 130 of FIG. 2 (e.g., a package that falls off a truck and onto a road), but that logic can define non-uniformity in different ways (e.g., something moving at relatively the same speed as the vehicle 110 of FIG. 2 is not defined as a non-uniformity).

At 830, a determination can be made on if the non-uniformity determined to exist is significant. If significant, then at 840 a notification can be expressed. If not significant (and along with notification expression when significant), then the method 800 can continue comparing waves at 810. In one embodiment, the method 800 is implemented by the system 400C of FIG. 4C, as part of a vehicle on-board computer (e.g., the controller 170 of FIG. 1).

Figure 9:
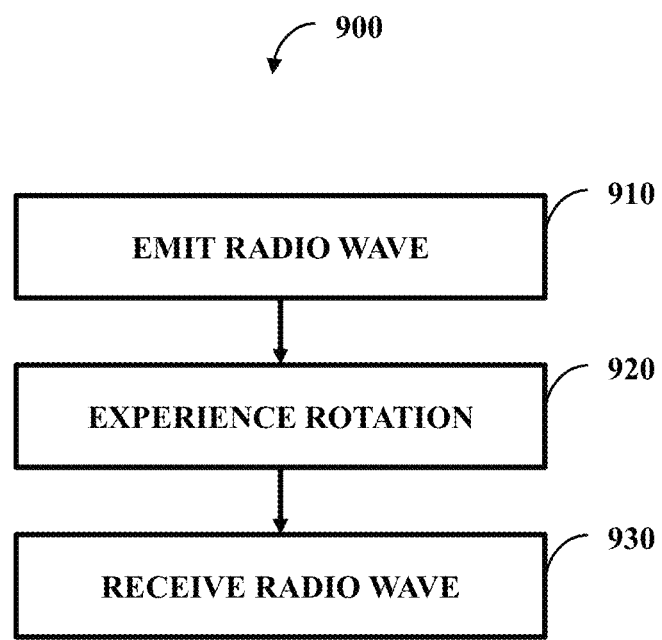
FIG. 9 illustrates one embodiment of a method comprising three actions.

FIG. 9 illustrates one embodiment of a method 900 comprising three actions 910-930. The method 900 can be performed by the module 160 of FIG. 2 while residing on the vehicle wheel 240 of FIG. 2. At 910, the module 160 of FIG. 2 can emit a radio wave and after this, at 920, the module 160 of FIG. 2 can experience a rotation. At 930, the module 160 of FIG. 2 can receive a radio wave that is a response to the radio wave emitted at 910.

In one example, the emission of 910 can occur when the module 160 of FIG. 4 is at P2 as illustrated in FIG. 4A and for a plus/minus frame (e.g., P2+/−two degrees). The module 160 can shut off (e.g., at P2+two degrees) until rotated back to P2 as illustrated in FIG. 4A (e.g., at P2−two degrees) where the module 160 of FIG. 4 turns back on. While on, the module 160 of FIG. 4 can receive the radio wave that is the response. This way, the module 160 of FIG. 4 can receive the response in roughly the same position as transmission, this minimizing impact from transmission and reception being in two different rotational positions.

Figure 10:
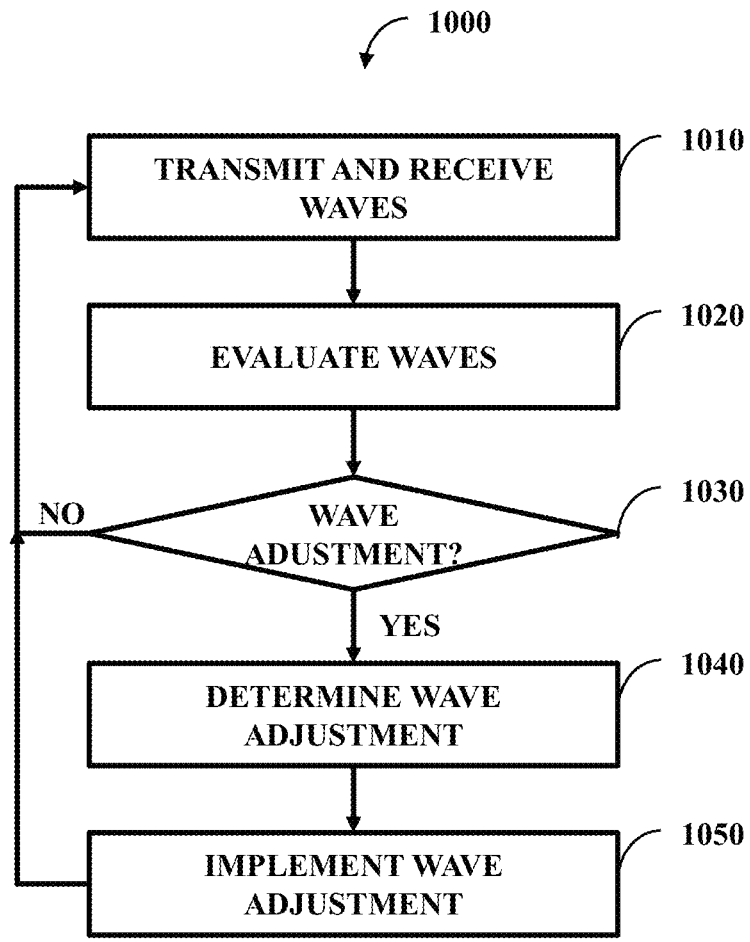
FIG. 10 illustrates one embodiment of a method comprising five actions.

FIG. 10 illustrates one embodiment of a method 1000 comprising five actions 1010-1050. As discussed in the previous paragraph, module management can be such that wave transmission and wave reception occur at roughly the same rotational position. However, this may not be practical since a response may not arrive and be obtainable when the module 160 of FIG. 4 is at a desirable position. Therefore, the method 1000 can be employed to allow reception and transmission when at significantly different rotational positions (e.g., outside the +/−two degrees).

At 1010, wave transmission and reception occurs. At 1020, the transmitted and received waves are evaluated (e.g., evaluated for content and evaluated for metadata, such as rotational position when transmission and reception occur).

At 1030, a determination can be made on if wave adjustment should occur. If so, then at 1040 appropriate adjustment can be determined and implemented at 1050. The method 1000 returns to, or if at 1030 it is determined not to adjust a wave, action 1010.

Adjustment of the waves can manifest in different manners. In one manifestation, x-axis, y-axis, and z-axis adjustment can occur. As can be seen in FIG. 4A, P1 and P2 have different x-y locations so if the wave 140 of FIG. 1 is sent at P1 and the wave 150 is received at P2. Also, where on the module 160 of FIG. 4 that the waves 140 and 150 of FIG. 1 are sent and received can be a z-axis change as well, or alternatively a shift in the location of the module 160 of FIG. 4 (e.g., if magnetic coupling, as opposed to being screwed in or welded, the module 160 of FIG. 4 may experience shifting). Waves can be modified as if they are sent and received at the same location for an accurate comparison. In one example, the module 160 of FIG. 1 can be placed on an airplane (e.g. tire of the airplane or elsewhere on the airplane, such as a propeller nose). Since airplanes can rise and fall quickly, the controller 170 of FIG. 1 can modify waves and/or take into account these changes when comparing.

In one manifestation, adjustment accounts for travel of the vehicle 110 of FIG. 4. The vehicle 110 of FIG. 1 can be an off-road motorcycle driving on rough terrain with the non-uniformity 130 of FIG. 1 being a rock. The motorcycle can transmit the wave 140 of FIG. 1, travel forward, and then receive the response wave 150 of FIG. 1 from the rock. To measure the distance of the motorcycle to the rock, an algorithm can be used that takes into account module position when transmitting, module position when receiving, time between transmitting and receiving, and speed of the motorcycle over that time between transmitting and receiving. In one example, the waves 140 and 150 of FIG. 1 can be adjusted for comparison based on vehicle travel time.

In one manifestation, the adjustment is based on interference (e.g., from a vehicle portion or environmental factors). In one example, the waves 140 and 150 of FIG. 1 travel through a vehicle portion (e.g., metal from a bumper, through fluid such as oil or windshield wiper fluid, etc.). If these are known, since they can be constant and composition of the vehicle 110 of FIG. 1 can be known, then compensation can be done with relative ease. However, environmental factors (e.g., interfering radio waves from other vehicles) can be more challenging, but still compensated for (e.g., vehicles communicate with one another on the frequency they are transmitting and negotiate to not have interference frequencies if possible once interference is identified).

In one manifestation, the adjustment is based on surface characteristics. In one example, the surface 120 of FIG. 1 can be a road and the non-uniformity 130 of FIG. 1 can be a tire fragment on a road. Since the tire fragment can be rubber with a steel belt, the wave 150 of FIG. 1 can be reflected back, but later than the actual beginning, relative to the vehicle 110 of FIG. 1, of the non-uniformity 130 of FIG. 1. As an example, the wave 150 passes through the rubber, then reflects off the steel belt—this would indicate that the non-uniformity 130 of FIG. 1 begins at the belt and not the rubber. To compensate for this, the module 160 of FIG. 1 can include an optical camera to work in conjunction with wave management.

Figure 11:
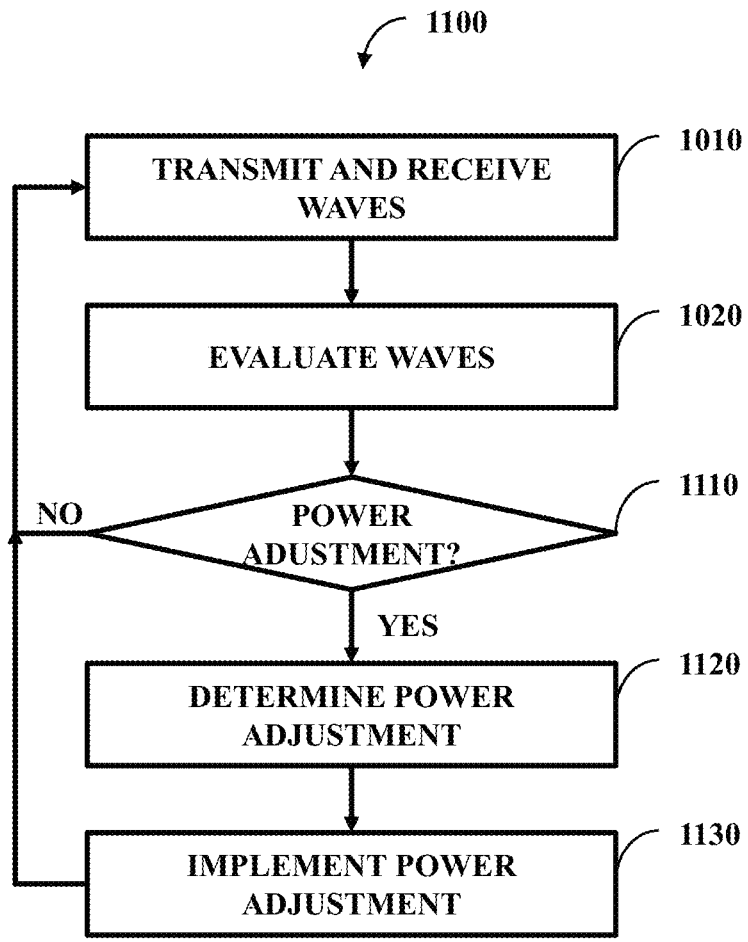
FIG. 11 illustrates one embodiment of a method comprising five actions.

FIG. 11 illustrates one embodiment of a method 1100 comprising five actions 1010-1020 and 1110-1130. As with the method 1000 of FIG. 10, at 1010, wave transmission and reception occurs and at 1020, the transmitted and received waves are evaluated. At 1110 a determination can be made on if the waves are of adequate power. If the waves are not of adequate power, then a determination can be made at 1120 (e.g., by the controller 170 of FIG. 1) on what the power level should be and at 1130, the adjustment can be implemented. After adjustment, or if no adjustment is appropriate in view of 1110, the method can continue transmission at 1010 at the appropriate power level.

In one example, a desired non-uniformity to detect can be landmines specifically constructed to thwart detection (e.g., landmines coated with a material that partially absorbs radio waves). The modules 160 of FIG. 1 can be configured to operate at a first power level of x, with x being a real number. A central command can determine that detection is ineffective and send an instruction to a group of modules on different vehicles (e.g., wirelessly) to increase power to increase likelihood of detection. In one embodiment, the frequency can be changed to be just outside radio frequency range or at a different radio frequency so that the waves are absorbed less.

Figure 12:
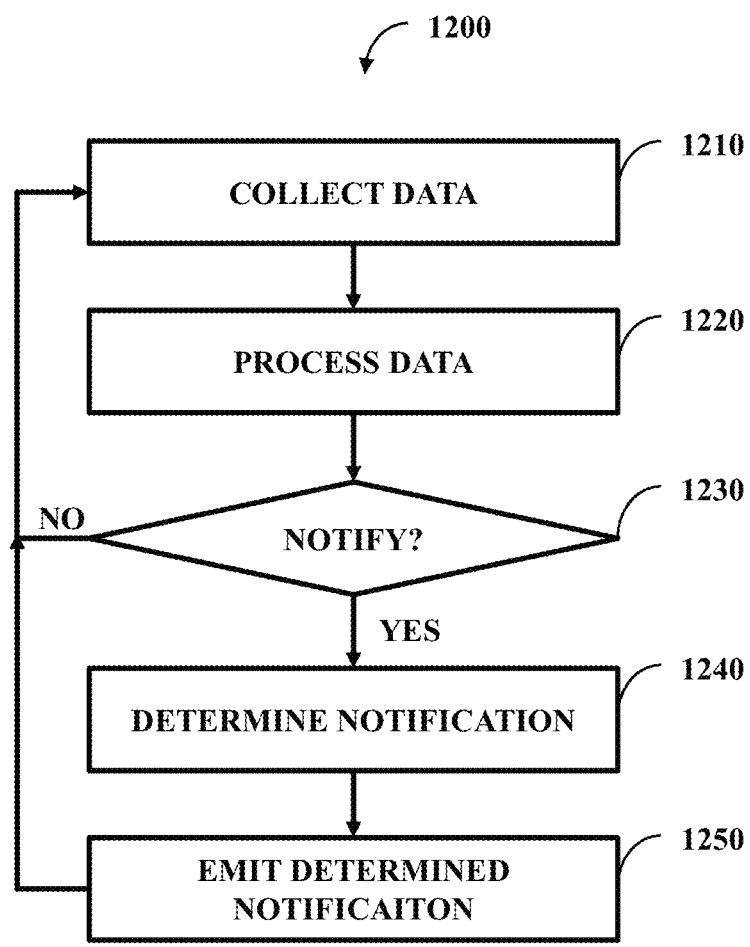
FIG. 12 illustrates one embodiment of a method comprising five actions.

FIG. 12 illustrates one embodiment of a method 1200 comprising five actions 1210-1250. At 1210, data can be collected. Example data can be the waves 140 and 150 of FIG. 1, module positional information when transmission and reception occur, vehicle speed, vehicle distance traveled, etc. At 1220, the data can be processed (e.g., by an onboard computer of the vehicle 110 of Figure implemented as the controller 170 of FIG. 1), such as determining a distance to the non-uniformity 130 of FIG. 1. At 1230, a check can occur to determine if a notification should be generated. If so, then at 1240 the type and/or characteristics of the notification can be determined and then at 1250, the notification can be emitted in accordance with the determination at 1240. This method 1200 can continue collecting and processing data as 1230-1250 occur and after.

As discussed above, distance from the non-uniformity 130 of FIG. 4 can be used to determine if to give a notification and/or what kind of notification to give (e.g., faster and/or louder notification if the non-uniformity 130 of FIG. 4 is relatively close to the vehicle 110 of FIG. 1). However, wave transmission and wave reception can occur at different physical locations. As can be seen in FIG. 4A, P1 and P2 have different x-y locations, so if the wave 140 of FIG. 1 is sent at P1 and the wave 150 is received at P2, then determining the distance can be more complex. Additionally, while the threshold is discussed above relative to the comparison result, other thresholds can be considered.

In one embodiment, a factor on if the notification should be produced can be vehicle distance to the non-uniformity 130 of FIG. 1. If the vehicle 110 of FIG. 1 is not close enough to the non-uniformity 130 of FIG. 1 (e.g., not within a maximum threshold distance), then the notification is not emitted. The closer the vehicle 110 of FIG. 1 is to the non-uniformity 110 of FIG. 1, then the louder and/or faster the notification can be.

In one embodiment, the check 1230 can be more complex. In one example, distance, speed, and non-uniformity characteristics can be correlated in determining if notification should occur and/or a characteristic of the notification. With this example, the slower the vehicle speed, the more significant of a non-uniformity 130 of FIG. 1 that can be comfortably tolerated (e.g., if the non-uniformity 130 of FIG. 1 can be comfortably tolerated, then no notification).

In one embodiment, the notification can be speed-based. With this example, a boat can be travelling at a knots on the water and a non-uniformity of FIG. 1 of y height (e.g., a wave swell or foreign object in the water) can be approached. The check 1230 can determine that a notification can be that the boat is travelling too fast for an operator of the boat to safely traverse the non-uniformity 130 of FIG. 1. In response to this notification, the operator can slow the boat to b knots (b being less than a). The check 1230 can now determine that the boat is not travelling too fast, so the notification can be stopped or modified. A user can change the threshold from being what can be safely traversed to what can be generally comfortably traversed. With this example, a, b, and y are real numbers.

Aspects disclosed herein can relate to the field of radio-wave scanning, detection, and measurement. In accordance with these aspects, radio waves can be applied to determine, from a safe distance, a presence of the non-uniformity 130 of FIG. 1 in the surface 120 of FIG. 1. The non-uniformity 130 of FIG. 1 can be due to, for example, terrain, debris, or an intentionally-placed object. Aspects disclosed herein can lend themselves to military and commercial applications. One possible military application is detection of a mine that is directly ahead of an approaching vehicle. One possible commercial application is for the automotive industry—as an after-market or built-in module for detecting potholes.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, comprising:
   a transmission component configured to transmit a radio wave;
   a reception component configured to receive a response to the radio wave, the response being a reflection of the radio wave;
   a comparison component configured to make a comparison of the transmitted radio wave against the response radio wave to produce a comparison result;
   a determination component configured to make a determination if the comparison result meets a threshold;
   a notification component configured to cause a notification to be issued when the determination is that the comparison result meets the threshold;
   a housing configured to retain the transmission component and the reception component; and
   a mount configured to physically couple the housing of a wheel of a vehicle such that when the wheel rotates the housing correspondingly rotates,
   where the transmission component is configured to transmit the radio wave when the housing is in a first rotational position,
   where the reception component is configured to receive the response to the radio wave when the housing is in a second rotational position,
   where the first rotational position is different from the second rotational position, and
   where the comparison component is configured to make the comparison while compensating for the difference between the first rotational position and the second rotational position.

2. The system of claim 1,
   where the reflection is from the transmitted radio wave encountering a non-uniformity of a surface upon which the vehicle travels.

3. The system of claim 2,
   where the mount is configured to physical couple the housing to a rim of the wheel.

4. The system of claim 1, comprising:
   an adjustment component configured to make an adjustment to the transmission radio wave to produce an adjusted transmission radio wave,
   where comparison component is configured to make a comparison between the adjusted transmitted radio wave against the response radio wave to produce the comparison result.

5. The system of claim 4,
   where the adjustment component is configured to make an adjustment to the response radio wave,
   where comparison component is configured to make a comparison between the adjusted transmitted radio wave against the adjusted response radio wave to produce the comparison result.

6. The system of claim 5,
   where the adjustment of the response radio wave compensates for the response radio wave travelling through a vehicle section and
   where the adjustment of the transmitted radio wave compensates for the transmitted radio wave travelling through the vehicle section.

7. The system of claim 5,
   where the adjustment of the response radio wave compensates for the response radio wave travelling through a tire coupled to the wheel and
   where the adjustment of the transmitted radio wave compensates for the transmitted radio wave travelling through the tire coupled to the wheel.

8. The system of claim 1,
   where the notification is a sensory alert to a driver of the vehicle.

9. The system of claim 1,
   where the vehicle is a self-driving vehicle,
   where the notification is a message to a control apparatus of the self-driving vehicle, and
   where the self-driving vehicle makes a driving adjustment in response to the message.

10. The system of claim 1,
    where the mount is configured to physically couple the housing to a tire side of the wheel.

11. The system of claim 1, comprising:
    an evaluation component configured to evaluate if the transmitted radio wave, the reflected radio wave, or a combination thereof are modified beyond an acceptable level, in relation to a threshold, from passing through a material of the vehicle;
    a decision component configured to decide a level to increase a power level at which the transmission radio wave is transmitted when the modification is beyond the acceptable level; and
    a causation component configured to cause the power level to be at the decided level,
    where the decided level is a level to cause the transmission to be at least at the acceptable level.

12. The system of claim 8,
    where the sensory alert comprises an audio portion.

13. The system of claim 8,
    where the sensory alert comprises a visual portion.

14. The system of claim 1,
    where the housing is configured to retain the comparison component, determination component, and notification component.

15. A system, comprising:
a comparison component configured to make a comparison between a transmitted radio wave against a response radio wave to produce a comparison result;
a determination component configured to make a determination if the comparison result meets a threshold;
a notification component configured to cause a notification to be issued when the determination is that the comparison result meets the threshold; and
an adjustment component configured to make an adjustment to the response radio wave to produce an adjusted response radio wave and to make an adjustment to the transmitted radio wave to produce an adjusted transmission radio wave,
where the transmitted radio wave is transmitted from a housing coupled to a rotational portion of a vehicle wheel,
where the reflection is from the radio wave encountering a non-uniformity of a surface upon which the vehicle travels,
where the transmission component is configured to transmit the radio wave when the housing is in a first rotational position,
where the reception component is configured to receive the response to the radio wave when the housing is in a second rotational position,
where the first rotational position is different from the second rotational position, and
where the adjustment adjusts the transmitted radio wave, the reflected radio wave, or a combination thereof to compensate for the difference between the first rotational position and the second rotational position.

16. The system of claim 15, comprising:
an adjustment component configured to make an adjustment to the response radio wave to produce an adjusted response radio wave and to make an adjustment to the transmitted radio wave to produce an adjusted transmission radio wave,
where the vehicle wheel is coupled to a vehicle,
where comparison component is configured to make a comparison between the transmitted radio wave against the adjusted response radio wave to produce the comparison result,
where comparison component is configured to make a comparison between the adjusted transmitted radio wave against the adjusted response radio wave to produce the comparison result, and
where the notification is a sensory alert to a driver of the vehicle.

17. The system of claim 15, comprising:
an adjustment component configured to make an adjustment to the response radio wave to produce an adjusted response radio wave and to make an adjustment to the transmitted radio wave to produce an adjusted transmission radio wave,
where the vehicle wheel is coupled to a vehicle,
where comparison component is configured to make a comparison between the transmitted radio wave against the adjusted response radio wave to produce the comparison result,
where comparison component is configured to make a comparison between the adjusted transmitted radio wave against the adjusted response radio wave to produce the comparison result,
where the vehicle is a self-driving vehicle, and
where the notification is a message to a control apparatus of the self-driving vehicle, and
where the self-driving vehicle makes a driving adjustment in response to the message.

18. The system of claim 15, comprising:
an evaluation component configured to evaluate if the transmitted radio wave, the reflected radio wave, or a combination thereof modified beyond an acceptable level, in relation to a threshold, from passing through a material of the vehicle;
a decision component to decide a level to increase a power level at which the transmission radio wave is transmitted when the modification is beyond the acceptable level; and
a causation component configured to cause the power level to be at the decided level,
where the decided level is a level to cause the transmission to be at least at the acceptable level.

19. The system of claim 16,
where the sensory alert comprises a visual portion.

20. The system of claim 15, comprising:
a non-transitory computer-readable medium configured to store an instruction set for effectuation of the comparison component, the determination component, the notification component, and the adjustment component; and
a processor, operatively coupled to the non-transitory computer-readable medium, configured to execute the instruction set.

* * * * *